(12) United States Patent
Postrel

(10) Patent No.: US 7,761,378 B2
(45) Date of Patent: Jul. 20, 2010

(54) METHOD AND SYSTEM FOR USING REWARD POINTS TO LIQUIDATE PRODUCTS

(75) Inventor: Richard Postrel, Miami Beach, FL (US)

(73) Assignee: Signature Systems LLC, Miami Beach, FL (US)

( * ) Notice: Subject to any disclaimer, the term of this patent is extended or adjusted under 35 U.S.C. 154(b) by 7 days.

(21) Appl. No.: 12/105,751

(22) Filed: Apr. 18, 2008

(65) Prior Publication Data

US 2008/0195494 A1 Aug. 14, 2008

Related U.S. Application Data

(63) Continuation of application No. 10/921,085, filed on Aug. 18, 2004, now abandoned, which is a continuation-in-part of application No. 10/608,736, filed on Jun. 27, 2003, now Pat. No. 6,820,061, which is a continuation of application No. 09/602,222, filed on Jun. 23, 2000, now Pat. No. 6,594,640.

(60) Provisional application No. 60/140,603, filed on Jun. 23, 1999, provisional application No. 60/503,299, filed on Sep. 15, 2003.

(51) Int. Cl.
*G06Q 40/00* (2006.01)
(52) U.S. Cl. .......................................... 705/40; 705/39

(58) Field of Classification Search .................... 705/15, 705/39–40
See application file for complete search history.

(56) References Cited

U.S. PATENT DOCUMENTS 4,554,446 A * 11/1985 Murphy et al. ............... 235/487
5,056,019 A * 10/1991 Schultz et al. ............ 705/14.25

OTHER PUBLICATIONS

Click Rewards—Member Agreement http://web.archive.org/web/19980516234621/www.clickrewards.com/NSU_b.html.

* cited by examiner

*Primary Examiner*—Thu Thao Havan
(74) *Attorney, Agent, or Firm*—Barkume & Associates, P.C.

(57) ABSTRACT

A user selects a product to be liquidated from a product provider and then designates to the transacting entity that reward points are to be used towards the purchase of the liquidated product. The transacting entity acts to decrease the number of reward points in the user's reward account by the required number of points. The reward account holder conveys consideration to the transacting entity equivalent to the par value of the reward points. The consumer obtains the product in exchange for reward points having a retail value equivalent to what he would have otherwise paid for the product, while the reward account holder is required to convey only the par value of the points. The product provider is able to liquidate the product and obtain payment equivalent to what it would otherwise have obtained in a prior art liquidation process, auction or trading environment.

75 Claims, 9 Drawing Sheets

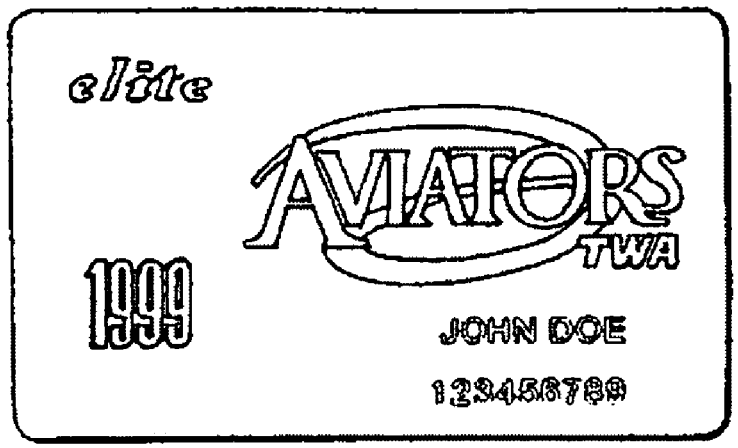
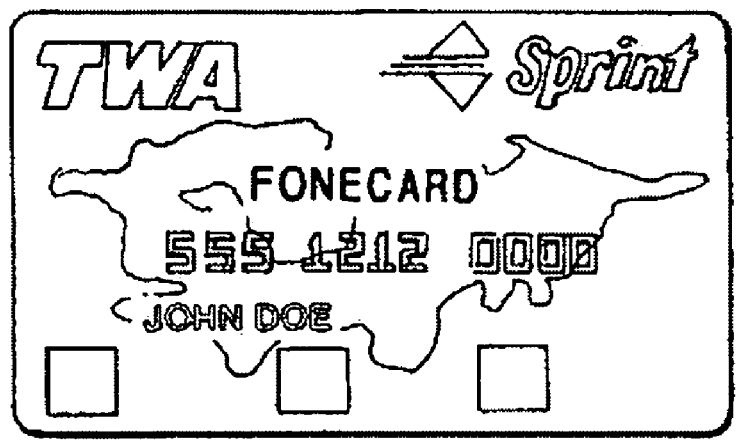
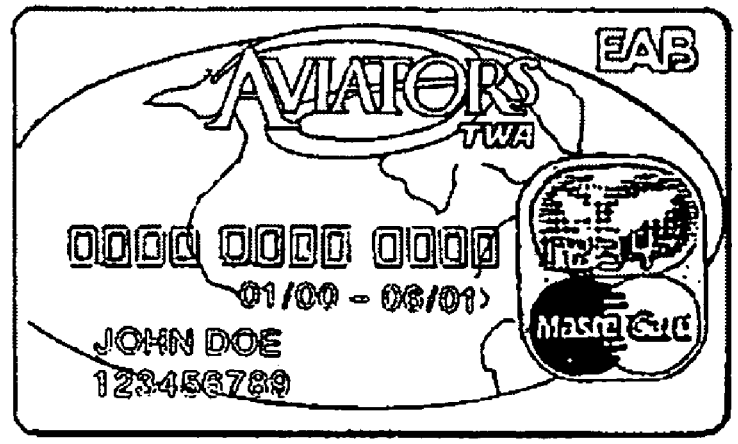
FIG.2
PRIOR ART

Account: John Doe
Account Number: 123456789
Enrollment Date: 12-21-1995
Privilege Card Type: Preferred Total Miles: 12,058
Non-Equity Miles: 967
Equity Miles:
Miles Available for Award Redemption: 11,025

| Activity Date | Type | Origin | Destination | Class | Flight No. | Description | Miles |
|---|---|---|---|---|---|---|---|
| 06-06-1999 | Other Activity | | | | | Hotel | 700 |
| 05-31-1999 | Other Activity | | | | | Credit | 2,725 |
| 05-21-1999 | Other Activity | | | | | Phone | 252 |
| 05-19-1999 | Statement Issued | | | | | STMT BAL | 7,348 |
| 05-18-1999 | Flight | LAX | LGA | Y | 701 | Y | 2300 |
| 05-16-1999 | Flight | LGA | LAX | Y | 801 | Y | 2300 |
| 05-16-1999 | Other Activity | | | | | Car Rental | 420 |
| 05-03-1999 | Other Activity | | | | | Hotel | 700 |
| 04-30-1999 | Other Activity | | | | | Credit | 2,908 |
| 04-21-1999 | Other Activity | | | | | Phone | 385 |
| 03-31-1999 | Other Activity | | | | | Credit | 1,870 |
| 02-28-1999 | Flight | LAX | LGA | Y | 701 | | 2300 |
| 02-21-1999 | Flight | LGA | LAX | Y | 801 | | 2300 |

FIG.3  PRIOR ART

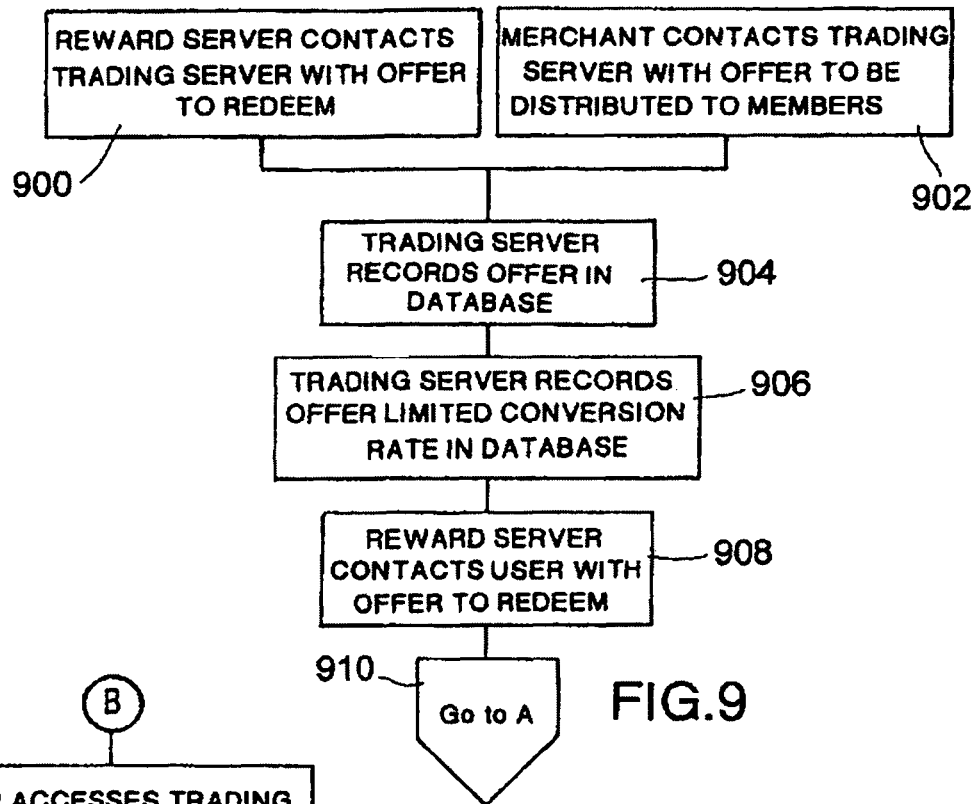
FIG.9
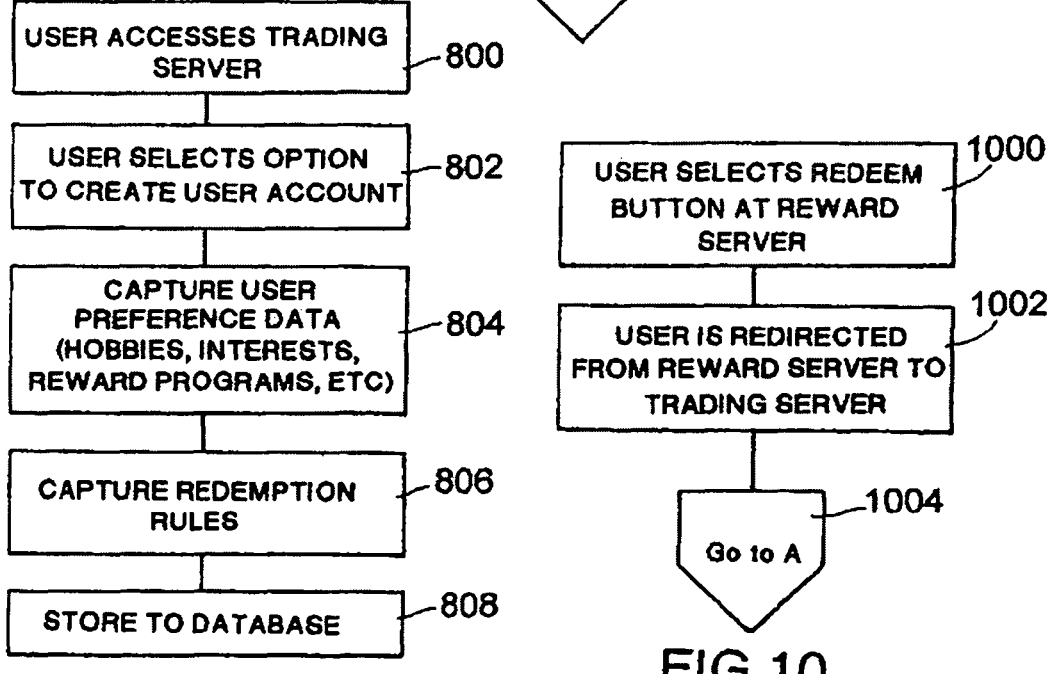
FIG.8
FIG.10

US 7,761,378 B2

METHOD AND SYSTEM FOR USING REWARD POINTS TO LIQUIDATE PRODUCTS

CROSS-REFERENCE TO OTHER APPLICATIONS

This application is a continuation application of U.S. application Ser. No. 10/921,085, filed on Aug. 18, 2004, which is a continuation-in-part application of U.S. application Ser. No. 10/608,736, filed on Jun. 27, 2003 (now U.S. Pat. No. 6,820,061), which is a continuation application of application Ser. No. 09/602,222 (now U.S. Pat. No. 6,594,640, issued on Jul. 15, 2003), which is based on and claims filing priority of U.S. provisional patent application Ser. No. 60/140,603, filed on Jun. 23, 1999. This application also claims filing priority of U.S. provisional patent application Ser. No. 60/503,299, filed on Sep. 15, 2003.

BACKGROUND OF THE INVENTION

The present invention relates to electronic trading, exchange, liquidation and bartering systems that allow users to trade or redeem reward points, such as those already accumulated in airline frequent flyer programs, into an account for redeeming products and services offered over a broad based communications system such as the Internet or interactive television. This would allow users to use their frequent flyer (or frequent car rental, frequent dining, etc.) points for products or services other than those which may be typically offered by the point sponsor. The points would be sold back or traded to the issuing entity or other third party. The system would also allow for purchase by users of points traded in by other users, such that points may be redistributed without incurring a transaction directly with the airline or other issuing entity.

The present invention also allows for manufacturers and distributors or traders of goods to put overstocked, discontinued, returned, or end of run products into a liquidation process that can be redeemed, purchased, traded or exchanged for reward points or similar value.

In order to attract and retain business customers, airlines, hotels, car rental companies, chain retailers, telecom providers, etc. have historically introduced frequency use programs that offer awards of "frequent flyer miles" or other such incentives schemes based on the distance traveled, amount of money spent, or use by that customer. Success has enabled airlines to modify the manner in which mileage was acquired to include travel related purchases by consumers. For example, a percentage of the dollar-based cost of a hotel stay may be awarded as mileage to a client account. Within the past several years, credit card companies or other retailers and etailers have co-branded credit cards in the name of airlines, oil companies, retailers, service companies, and the credit card company where each dollar spent using the card is recorded as a mile or unit of travel, reward point or similar value in the award program or some monetary value assigned by the issuer. These cards may additionally award bonus miles, points or other value in coordination with user purchases of preferred products or flights during preferred times.

U.S. Pat. No. 5,774,870, FULLY INTEGRATED, ON-LINE INTERACTIVE FREQUENCY AND AWARD REDEMPTION PROGRAM, issued to Netcentives, Inc. on Jun. 30, 1998. The '870 patent provides a system whereby the user can make purchase of products over the Internet and receive award points, which are stored in an associated database. The user can subsequently view an award catalog to determine which awards he may be able to redeem based on the number of points in his account. This patent does not teach, however, the ability of a user to trade-in his points accumulated in a pre-existing frequent flyer account in order to make purchases of products from the award catalog or allow the points to be pooled with other programs in order to gain further purchasing power.

The ClickRewards program site appears to operate in the same fashion as that described in the '870 patent; i.e. it allows users to gain points (called "ClickMiles") for making an online purchase of a product through an associated web site. For example, ClickMiles may be awarded for a purchase of Gap products at the Gap web site. The ClickMiles can ultimately be redeemed for frequent flyer miles, for example at one of several major airlines. Another web site, www.webflyer.com, is associated with ClickRewards and provides ClickMiles for purchasing frequent flyer-related goods, such as guidebooks.

The ClickMiles Reward Catalog allows the user to redeem the ClickMiles for merchandise in the alternative to frequent flyer miles. For example, a CD can be obtained from CDNow by redeeming 900 ClickMiles.

Although the ClickRewards program allows a user to redeem accumulated points for obtaining merchandise over the Internet, it does not allow for the redemption of frequent flyer miles from a pre-existing account to be traded for reward points.

U.S. Pat. No. 5,794,210, ATTENTION BROKERAGE, issued on Aug. 11, 1998 to CyberGold, Inc. The '210 patent describes a system that makes immediate payment to a user for paying attention to an advertisement or other "negatively priced" information distributed over the Internet. A special icon or other symbol displayed on a computer screen may represent compensation and allow users to choose whether they will view an ad or other negatively priced information and receive associated compensation. The points accumulated can then be used to purchase "positively priced information" or products.

The CyberGold web site, www.cybergold.com, describes an "earn and spend" community in which users earn "cash" online, for example by visiting a portal site. The earnings can then be used to make online purchases, such as software.

Again, although the '210 patent and the CyberGold web site describe an incentive system that allows users to purchase products or services over the Internet, neither teaches the ability of the redeeming frequent flyer miles from a pre-existing account for reward points.

U.S. Pat. No. 5,025,372, SYSTEM AND METHOD FOR ADMINISTRATION OF INCENTIVE AWARD PROGRAM THROUGH USE OF CREDIT, issued on Jun. 18, 1991 to Meridian Enterprises, Inc. The '372 patent describes an incentive award program in which credit is awarded to participants based on the participant meeting a designated level of performance under the system. This patent does not teach the ability to increase the reward points in a user's account by redeeming points from a pre-existing account such as a frequent flyer mileage program.

With regard to FIG. 1, a model of the frequent flyer systems of the prior art is presented. Two different airlines servers are shown surrounded by their related marketing partners, the first grouping labeled Airline 1 100 and the second independently operated but functionally similar grouping labeled Airline 2 200. In order to lure more business travelers, the airlines 100, 200 have established marketing agreements with travel related companies to provide the business traveler with a more robust way to generate rewards in the form of frequent flyer miles. These marketing arrangements or associations have typically involved credit card companies, phone companies, hotel chains and car rental companies. Any purchases made through these "co-branded" partners were then awarded to the user periodically. Bonus miles or points may additionally be accumulated based on the user's actions in response to offers made by the airline or in coordination with the partner company. For example, phone companies offer bonus miles to users based on the user's agreement to change phone service. These points are obtained by the partner companies by purchasing them from the issuing entity for redistribution as an incentive to utilize their particular goods and/or services. FIG. 2 shows some sample co-branded cards that are representative of marketing agreements between TWA, Sprint, and Mastercard. In order to receive these benefits, the user must sign up with each of the partner companies separately and provide the frequent flyer account number that is to receive the credited miles. A user either making phone calls or purchases in accordance with the agreements made with each of these partners will first accumulate a value on the partner's system which in turn is periodically updated on the issuer's reward server to reflect the value earned during that period. FIG. 3 is representative of a typical user account that shows various earnings in the system transferred in from any of the co-branded partners. The records of the table in FIG. 3 identify the source of the rewards, the dates they were recorded and the number of miles associated with that transaction. The user can view the accumulated miles by accessing the issuer's reward server or by tracking the individual value reported to the user through the various bills the user receives from each of the co-branded partners.

The prior art does not provide for a consumer to utilize relatively small amounts of reward points in any manner. In addition, a consumer often can only redeem points in an airline-related manner (i.e. to obtain a free ticket or upgrade from coach to first class). This prior art does not recognize the need for a consumer to exchange reward points for non-travel related goods, and in particular renders relatively small numbers of points useless. For example, a consumer that does not travel often may have 500 points in United Airlines, 700 points in USAir, and 1000 points in TWA, each of which is relatively useless in the prior art.

What is desired therefore is a system where users may submit frequent flyer awards, reward points or other credits accumulated for other types of transactions for redemption or translation into a form readily acceptable by a participating merchant. An exchange rate will be established for the relative consideration received by the companies involved in the transaction. A user should be able to pool, trade or aggregate the various earned rewards that may exist in currently separate reward server systems where the resulting combined value may be used by a user of the system to acquire items of equivalent or relative value. In another embodiment, the award program looking to reduce frequent flyer liabilities or exchange redemption opportunities to increase customer satisfaction may contact users (or be contacted by other members of the system) and arrange for a transfer of the reward points into a value (which may be predetermined) to be credited to the trading system reward account. Alternatively, the points may be used in an auction environment where points may be used to bid for certain awards, products, services, or points from other programs. A user can utilize points to bid for products or use value to bid for points. Groups of bidders may pool points together for purchases or donations. A user who has earned frequent flyer miles or rewards from several points issuers that, individually, may be insufficient to receive any direct value for their mileage may be able to pool the miles acquired from several different points issuers to transfer the awards accumulated to the trading system of this invention. The user may have the selected items delivered by performing a purchase request by various means such as over the Internet, dialing a toll free number for placing an order, or any other means of placing an order that will accept payment from this system.

It is further desired to provide a system and method that enables product providers such as manufacturers, wholesalers, distributors, retailers and/or liquidators to liquidate their products through a liquidation service run by a transacting entity such as a liquidation broker, which will accept reward points directly or indirectly from a user as consideration (in whole or in part) for obtaining the product.

It is also desired to provide a system and method for users to purchase, sell, or trade in points or blocks of points or value, wherein the value and/or cost of the points is a function of the open marketplace or the performance or desire of the issuing, trading, selling purchasing or redeeming entity, either presently or at some time in the future. This would allow users to obtain points in the present time based on either the present or the future performance of the issuer.

SUMMARY OF THE INVENTION

This invention allows a user to purchase goods or services using reward points held by a variety of award programs or co-branded partners (where individual accounts may or may not be maintained) that are aggregated into an exchange account. A frequent flyer program is typical of the systems to be encompassed by this invention. Tie-in promotions have been introduced over the past several years that have allowed purchases for goods and services such as hotel or car rentals to accumulate award miles that are then recorded on the airline award system. More recently credit card companies offer cards where a mile or point award (or similar value) is made for every dollar spent using that credit card. These cards may additionally award bonus miles, points or other value in coordination with user purchases of preferred products.

A system and method are disclosed where the system allows the user to redeem the reward points aggregated from a plurality of reward entities for exchange with a merchant or other trader or member of the system (referred to generically herein as a "merchant"). As used herein, a reward or reward point refers generally to a frequent flyer mile or credit, reward point, rebate, cash-back value, or any other value awarded by a party to a consumer (also known as a user) based on a transaction between the party (or an affiliated party) and the consumer, where that reward is typically tracked by the entity issuing the reward until redeemed or otherwise surrendered or retired by the consumer or other user. The process for redemption or exchange of the pre-accumulated reward points under this invention comprises the steps of the user requesting, via a user computer or other electronic device, an exchange server computer (also referred to as a trading server computer) to obtain reward points from a reward server associated with a rewarding entity with which the user has reward points or other value. The reward server computer decreases the number of points or amount of value in the user's reward point account by the requested number of reward points. The reward server computer conveys consideration to the exchange server computer, where the consideration corresponds to the number of reward points decreased in the account of the reward server. The exchange server computer increases the reward exchange account on the exchange server associated with the user by the requested number of points or value. The exchange server receives the consideration from the reward server computer. Following or anticipating this conversion into the exchange server, the user requests a purchase, exchange or trade of an item from an associated merchant computer by selecting the item to be purchased from a plurality of available items. The exchange server computer confirms that the user's reward exchange account contains sufficient points or value to obtain the selected item or that the offered amount has been accepted. The user may purchase or borrow additional points or value in the event that his account does not contain the requisite number of points or value for making the purchase transaction or the user's offer has not been accepted. The user may also provide cash or other consideration as partial payment for the item selected. The exchange server computer requests the merchant computer to deliver the item to the user. The exchange server decreases the user exchange account by the number of points corresponding to the purchased or exchanged item and the exchange server computer conveys consideration to the merchant computer equivalent to the required points. In another embodiment, the user may redeem rewards at the reward server following the selection of an item to be acquired. Policies may be established to automatically contact each of the servers according to a user procurement profile to transact the required payment. This profile may indicate the order of redemption and method of providing funds sufficient to cover the purchase after redeemable points are exhausted. After redemption the appropriate consideration is transferred to the respective merchant.

In a further embodiment of the invention, product providers such as manufacturers, wholesalers, distributors, retailers and/or traders are able to liquidate goods via a transacting entity such as a liquidation broker or exchange service, which acts to exchange a user's earned or otherwise acquired reward points for the liquidated goods in a manner that is transparent to both the redeeming user and the product provider. In this embodiment, a user selects a product to be liquidated from a product provider (such as the product manufacturer, wholesaler, distributor, retailer or trader). The user may be a consumer, or it may be a third party such as a trader or the like. The user designates to the transacting entity that reward points are to be used towards the purchase of the liquidated product in whole or in part. The reward points may be obtained directly from a reward account held by a reward server on the user's behalf, or they may be obtained from an aggregated reward point exchange account that holds reward value aggregated from multiple reward points issuers. In any event, the transacting entity acts to decrease the number of reward points in the user's reward account, as either designated by the user or by a third party (or directed by a prearranged set of rules), by the required number of points. The reward account holder (which is either a reward issuer or an aggregator) conveys consideration to the transacting entity equivalent to the par value (or a portion thereof) of the reward points. In this case, the consumer obtains the product in exchange for reward points having a retail value equivalent to what he would have otherwise paid for the product at a retail store (a "reference price"), while the reward account holder is able to convey only the par value of the points (which is generally substantially less than the retail value of the points). The product provider is able to liquidate the product and obtain payment (the lower par value of the reward points) equivalent to what it would otherwise have obtained in a prior art liquidation process, auction or trading environment, but without having to go through a typical "liquidation process" with its accompanying brand devaluation and associated costs. The reward account holder is able to eliminate the liability of the reward points previously owed to the user, but pays far less (only at the lower par value) than the retail value of the points assigned by the user. As described, the user may utilize reward points from a single reward issuing entity, or he may aggregate points from multiple reward issuing entities as described herein (cash and/or other consideration may also be combined with points as described herein).

BRIEF DESCRIPTION OF THE DRAWING

FIG. 2 is a representation of the co-branded partners in a prior art award program;

FIG. 3 is a sample of the prior art reward summary from an airline frequent flyer system;

FIG. 8 is a data flow diagram of the user account creation process on the exchange server;

FIG. 9 is a data flow diagram of the offer process by a reward program or by a merchant;

FIG. 10 is a data flow diagram of the process where a user may be redirected from a reward program to the exchange server of the present invention.

DETAILED DESCRIPTION OF THE PREFERRED EMBODIMENT

Figure 4:
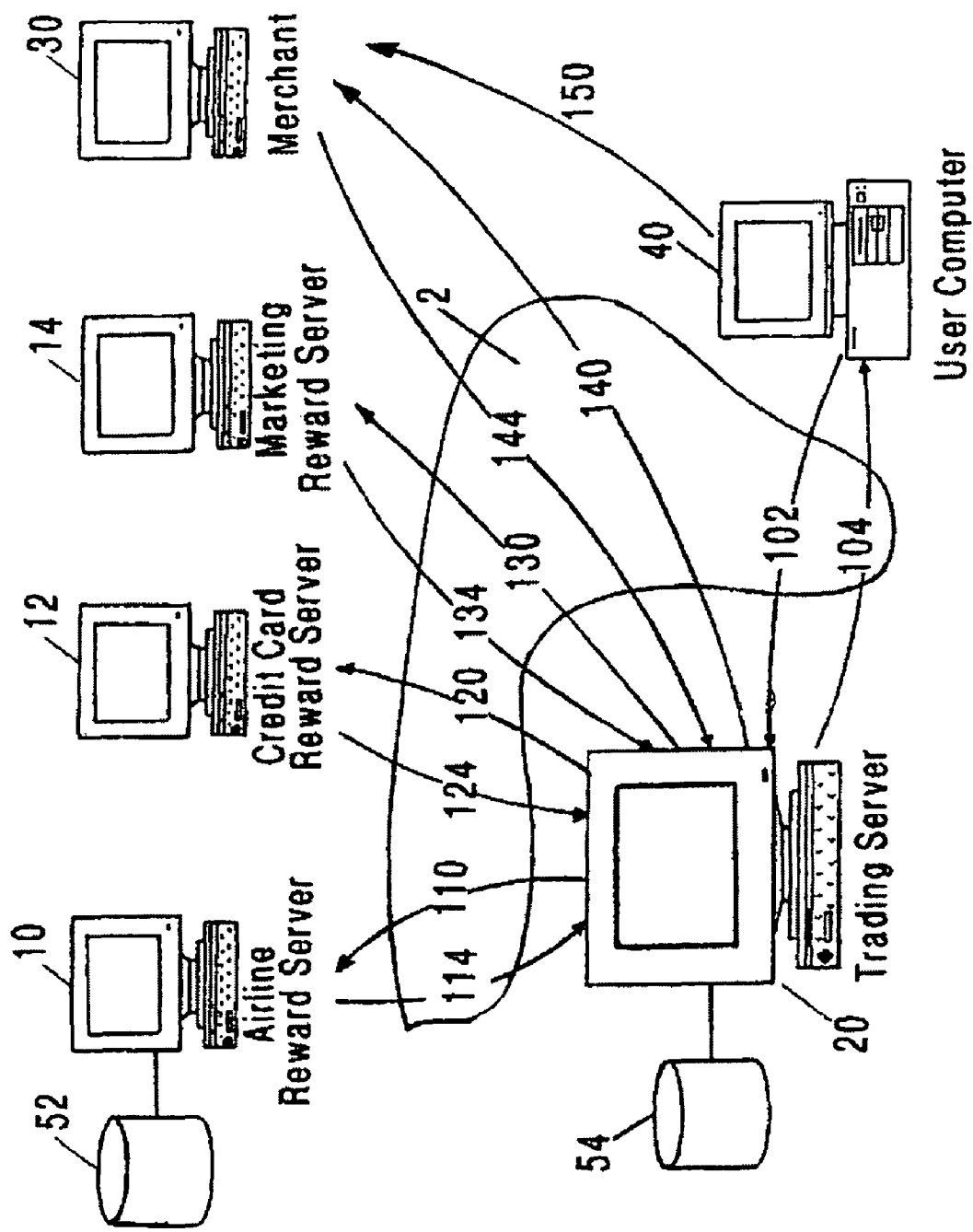
FIG. 4 is a block diagram of the components of the present invention.

With reference to FIG. 4, a plurality of reward server computers 10, 12, 14, a trading server (also referred to as an exchange server) 20, a merchant computer 30 and a user computer 40 are shown in communication with a network 2. The network may comprise any type of communication process where computers or computing devices may contact each other. The present invention will be described with respect to an Internet-based network where the reward server computer 10 is associated with an airline frequent flyer program. Any type of reward server may also be used in this system. The reward server computer may be a credit card reward program such as that offered by AMERICAN EXPRESS where the user earns rewards based on purchases, or an advertising based award program where the user earns rewards by selecting advertising content for viewing on the Internet.

Figure 1:
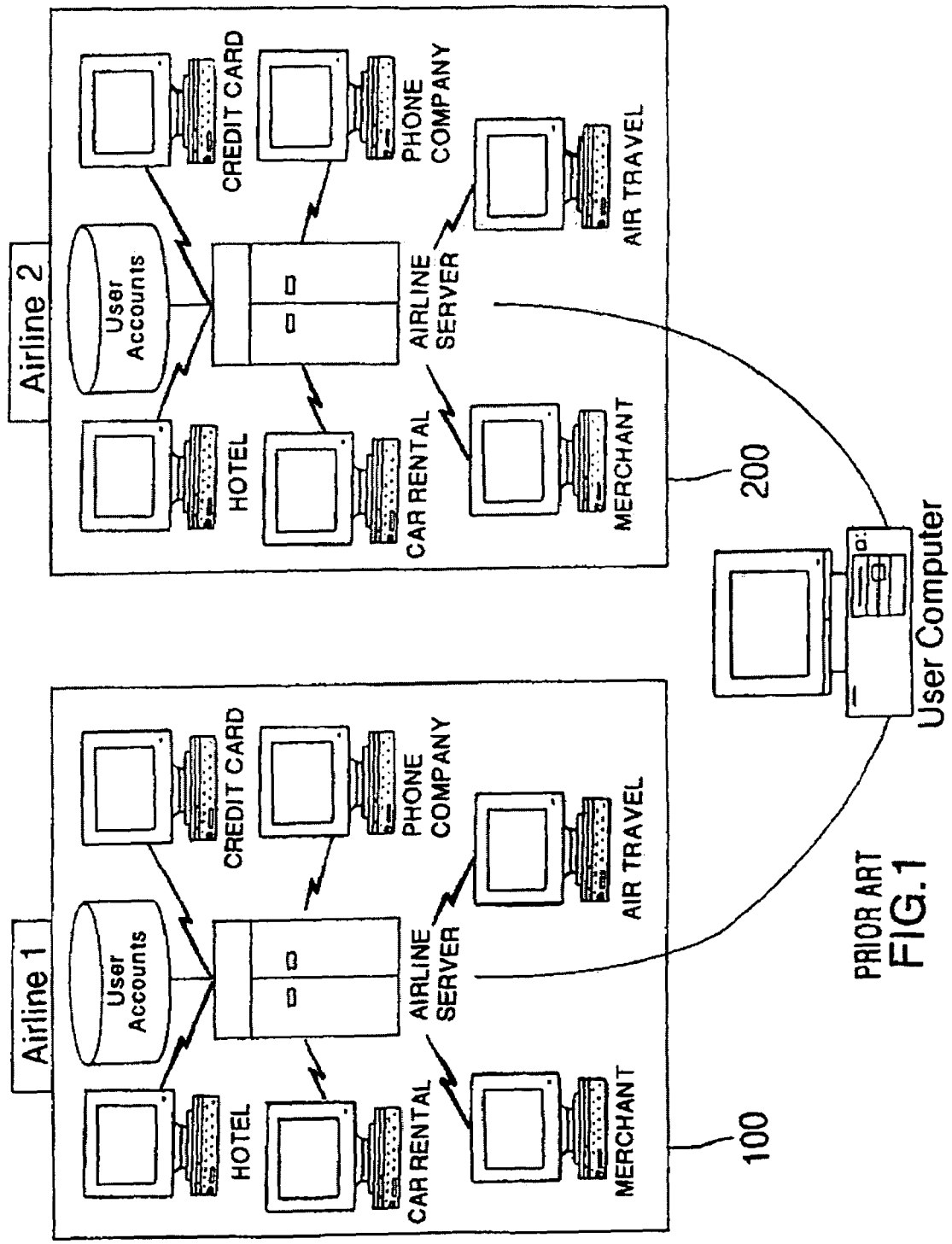
FIG. 1 is representative of the prior art marketing arrangements used in reward programs.

A user of this system may acquire and accumulate rewards through any prior art means such as that shown on FIG. 1, which are then posted in a user's reward point account 52 that is accessible through the reward server computer 10. The exchange server computer 20 is in communication through the network 2 with a user on a user computer 40 and is additionally able to connect to the reward server computers 10, 12, and 14 through the network 2 in accordance with techniques well known in the art for Internet communications. Alternative electronic communications methodologies may be used, such as an ATM, POS device or credit card network interface device adapted to allow a user to access his accounts, or a smart card reader, etc. The merchant computer 30 is representative of any site that can communicate with the network that has goods or services for sale or trade. The merchant may have a direct relationship with the exchange server where the direct relationship allows for a streamlined process for allowing a user to acquire products offered via the merchant computer. Alternatively, the merchant computer may be an independent merchant that does not currently have a profile defined in the exchange server that will accept payment from another computer system in any one of well known e-commerce embodiments.

The rewarding entities may be any type of entity that has a service for allocating points or consideration for user actions. The reward server computers 10, 12, 14 may be of any type of accessible server capable of holding data about a user along with a corresponding earned value that is negotiable for other goods, services, or points of another system or for use internal to the trading system. In the preferred embodiment, the airline reward server computer 10 may refer to one or several different airlines that have frequent flyer programs or the like. The credit card reward server computer 12 may refer to any type and number of credit card server systems capable of holding, increasing or decreasing a user's earned rewards acquired according to the terms of the credit card program to which the user has enrolled. The marketing reward server computer 14 may refer to one or a multitude of network accessible marketing systems that allow a user to have an account where points or other redeemable value may be stored, updated and redeemed by a user. The exchange server computer may be any type of computer system that allows users to access the system in order to perform the processes involved in this invention. In the preferred embodiment all of the systems described are accessible through the Internet and the user may automatically or freely navigate to any site by means well known in the art.

The present invention allows points issuers, who originally sold reward points in their program to third parties for use as an incentive by those third parties, to repurchase or trade points at a substantial discount, thereby reducing their liability and allowing for a trading strategy that enables points to continually be sold, traded or repurchased. This process may be executed under a separate accounting procedure than what is otherwise used for points that are granted directly from the issuer.

Figure 5:
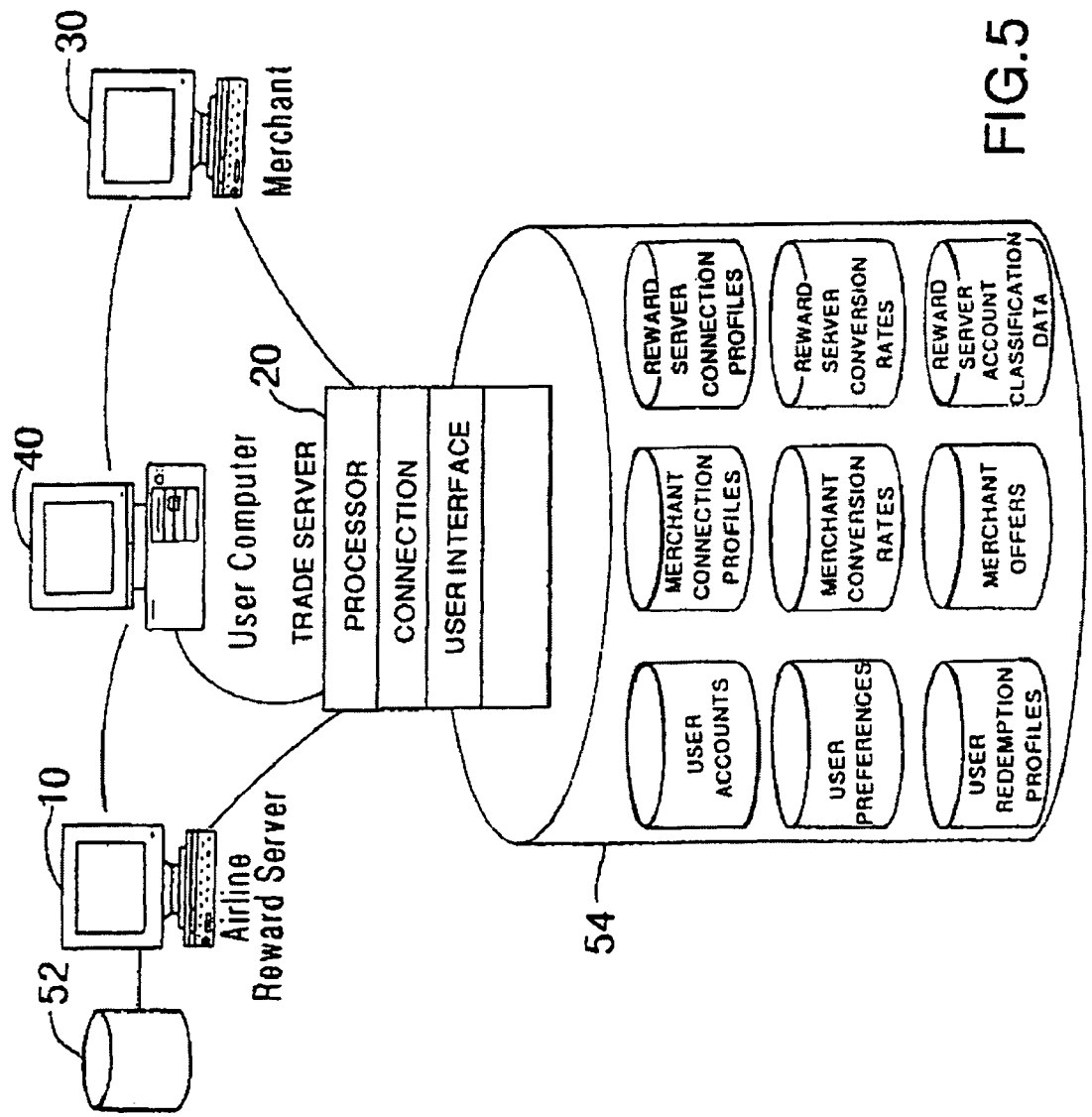
FIG. 5 is a block diagram of the system components of the present invention.
Figure 6:
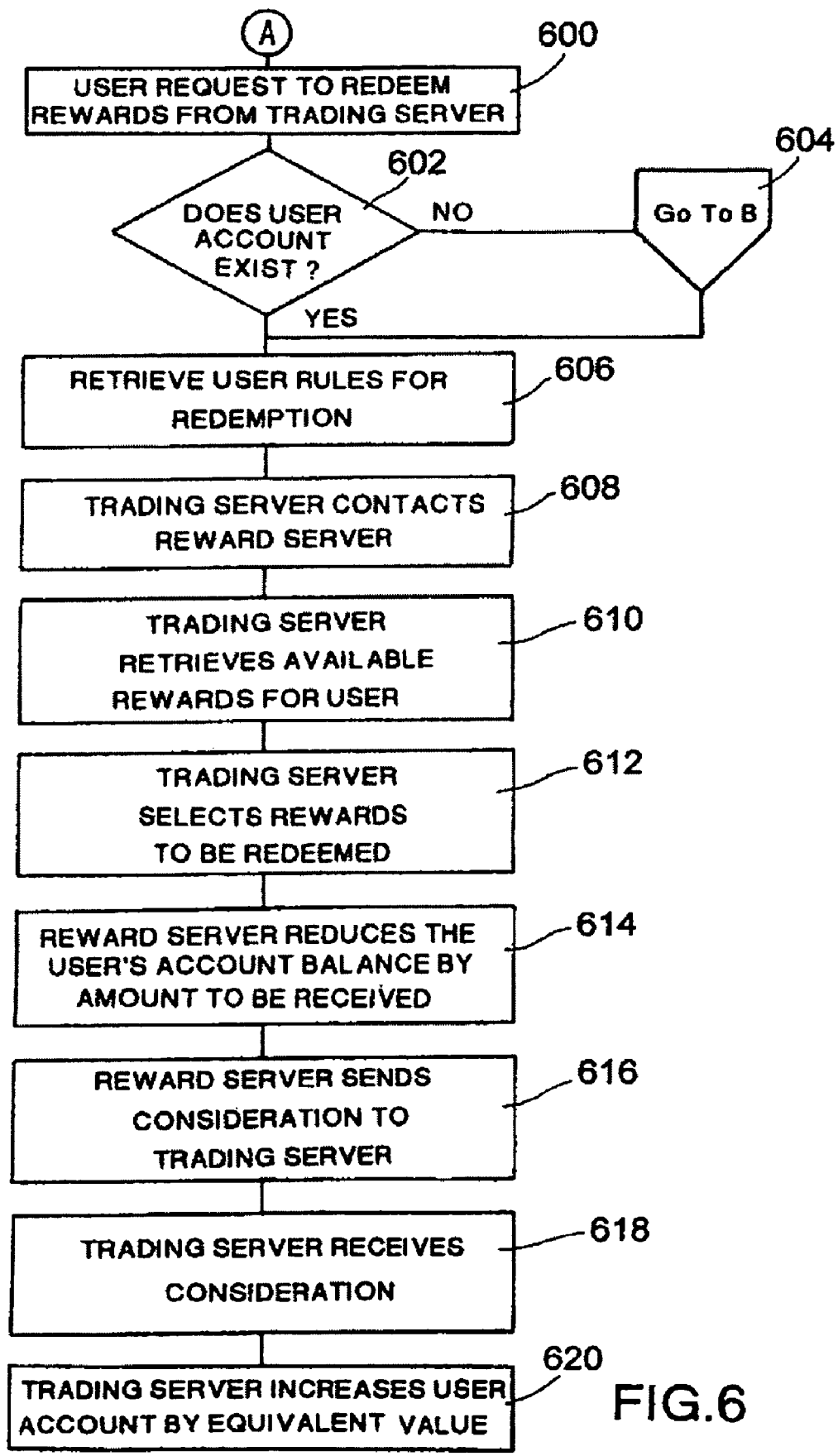
FIG. 6 is a data flow diagram of the process for a user to redeem rewards.

The method of allowing the user to redeem the accumulated reward points from one or more of a plurality of reward entities will now be described with respect to FIG. 4 and the data flow diagram of FIG. 6. The exchange server system would allow users to log in to access the functionality provided, where the user may interact with applications, forms or controls. For example, the user may view his account information by using a web browser which may automatically select or allow the user to enter the appropriate identification information and then select buttons, links or other selectable objects to navigate to the part of the system desired. In the alternative, navigation may be done automatically by the web site, and thus be transparent to the user (i.e. not directly controlled by the user). If the user does not yet have an account (step 602), then the user may be enrolled per the flow diagram of FIG. 8 (step 604) as discussed below. The user, from the user computer, makes a request to the exchange server computer 20 via communications flow 102 (step 600), requesting redemption through the network 2 for either all or a portion of the pre-accumulated reward points stored for the user in one of the rewarding entities. A user's reward point account 52 is associated with each of the reward servers but is only shown in FIG. 4 connected to the airline server for sake of clarity. Communications are made by the exchange server 20 to the user computer 40 via communications data flows 104. The user may interactively select rewards to be redeemed, or the system may determine which rewards are to be redeemed based on a previously defined user profile rule or other third party profile rule (such as an issuer) (step 606). The exchange server computer 20 obtains the reward points balance information from a reward server 10, 12, 14 stored in the user's account 52 by contacting the appropriate reward server via communication flow 110 (step 608) according to the user's requirements, by using the connection parameters as defined in a database 54 on the exchange server as shown in FIG. 5. In one embodiment, the exchange server retrieves reward point account balance information via communications flow 114 (step 610) from the reward server for the user. In another embodiment, the exchange server transfers as part of the communication 110, the requested reward points to be redeemed (step 612). The reward server computer 10 decreases the user's reward point account 52 by the requested number of reward points (step 614). The term point is used to reference any earned value that has a cash equivalent or negotiable worth as in "frequent flyer" point or mile. The reward server computer 10 conveys consideration to the exchange server computer 20 where the consideration corresponds to the number of reward points decreased in the user's account 52 on the reward server 10 (step 616), taking into account a conversion rate that may be stored in the database 54. For example, the consideration may be in the form of a monetary credit to an account that exists between the exchange server and the reward server, that gets paid at the end of a predefined billing cycle (i.e. every month) or in real time or upon execution of a trade or redemption procedure. The exchange server computer 20 increases the reward exchange account 54 associated with the user by the received number of points (step 620). The exchange server computer 20 in turn, receives the consideration from the reward server computer 10 (step 618).

Similar communications are made between the exchange server 20 and the credit card reward server 12, as indicated by the data communications 120 made by the exchange server 20 to the credit card reward server 12 and the data communications 124 made by the credit card reward server 12 to the exchange server 20. Likewise, communications are made between the exchange server 20 and the marketing reward server 14, as indicated by the data communications 130 made by the exchange server 20 to the marketing reward server 14 and the data communications 134 made by the marketing reward server 14 to the exchange server 20. In each case, the exchange server 20 increases the user's reward exchange account 54 by the received number of points from the credit card reward server 12 and the marketing reward server 14, respectively, based on the appropriate conversion rate. Exchange rates may float or be variable according to value of the acceptance of bid and ask terms.

Figure 7:
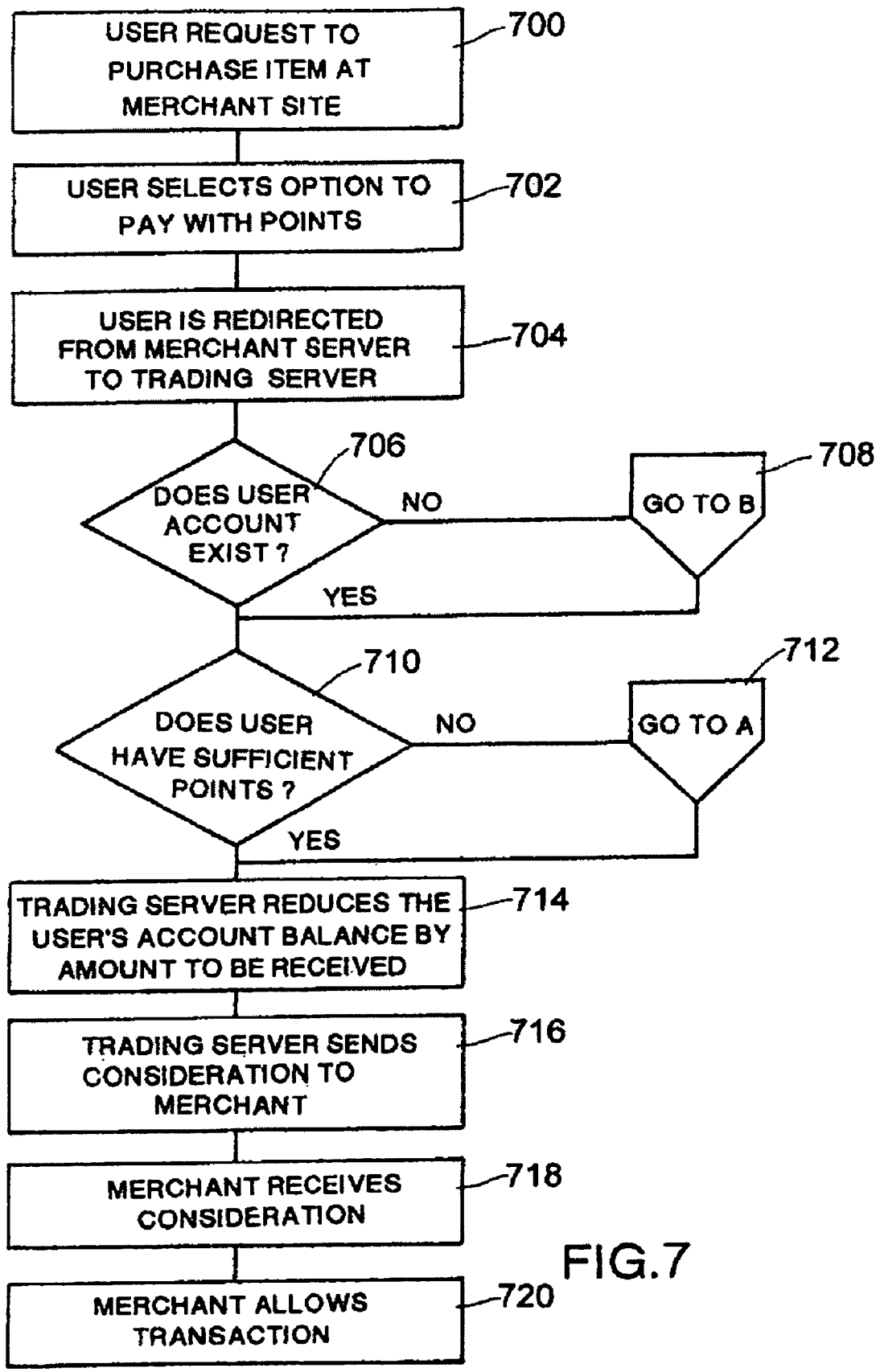
FIG. 7 is a data flow diagram of the user request for purchase of an item at a merchant site.

In the second part of the transaction (see FIG. 7), the user from a user computer 40 may make a request 150 to purchase an item from an associated merchant computer 30 (step 700) or from a catalog or network of offerings or special event offerings as a one-time or unique event. In the preferred embodiment, the merchant computer system will be a networked computer system accessible via the Internet. The user would visit the site by selecting on a link from the exchange server's web site or by entering the name or address of the destination web site or product brand or category desired. The web site may also be pushed to the user rather than pulled by the user as described above. The user may identify one or many items to be acquired from one or several merchants 30. The user elects to pay for the desired item with points (step 702), and the user is redirected from the merchant server to the exchange server at step 704. If the user does not have an account (step 706) then the user is enrolled per the flow diagram of FIG. 8 (step 708). The merchant server computer 30 would confirm that the user has sufficient points or value to purchase the selected item by communicating with the exchange server 20 via communication flows 140, 144 in order to check the user's reward exchange account 54 (step 710). If the user does not have enough points in his reward exchange account at the exchange server 20, then the process of trading more points from the user's reward point account 52 into his reward exchange account 54 is executed by branching to the flow diagram at exit point A (step 712) which brings the process to the flow diagram in FIG. 6 discussed above. After enough points are traded or accumulated, the user continues with the process from step 712 as shown in FIG. 7. The user may also purchase or borrow additional points to make purchases or trades. The exchange server computer 20 would request the merchant computer to deliver the item to the user. The user delivery information may be retrieved from the exchange server computer 20 or may be supplied in some other manner. The exchange server computer 20 would decrease the user exchange account 54 by the number of points or value corresponding to the purchased item (step 714). The exchange server computer 20 conveys consideration to the merchant computer 30 equivalent to the cost of the item by means well known in the art of electronic commerce (e.g. by a preexisting account, credit card, etc.) (steps 716, 718). In the alternative, the consideration may be a direct transfer of points to an account associated with the merchant. The merchant, transaction broker, liquidator or member then completes the transaction at step 720, for example by delivering the purchased item. A transaction fee may be charged by any of the parties in the form of points, cash or cash equivalent, etc. Also, a delivery fee may be charged for delivery of the product.

Policies and profiles may be established to automatically contact each of the reward servers according to a user profile, merchant profile, broker dealer profile, issuer profile, or product provider redemption profile (see FIG. 5) to transact the required payment for an item selected by a user. This profile may indicate the order of redemption and method of providing funds sufficient to cover the purchase after redeemable points are exhausted. For example, if a user has a preferred air carrier where the user would like to retain mileage in that reward system, the user may specify a priority of use indicating the reward resources that should be exhausted prior to accessing the most desirable rewards. Following the selection of an item to be acquired, the server may contact all of the reward resources according to this profile to selectively redeem each as required to meet the purchase price. The process may be performed in real time or as a background process transparent to the user, or where the user may select how the transaction should proceed. If the user exhausts lower personal worth resources from the reward servers, the system may be required to contact the user before the transaction is allowed to proceed to redeem points. A classification system may also be used to indicate rewards of similar worth or category. If for instance, a frequent flyer program supports multiple classifications of miles that may be redeemed differently, the user may optionally define how those resources should be managed during redemption. The redemption process would then honor those rules elected by the user to select from several different reward programs instead of redeeming rewards strictly on a value required from the first reward program contacted or based upon a preferred hierarchy defined by the system or its members.

FIG. 8 describes the process steps involved in enrolling a user to utilize the exchange server. The user accesses the exchange server 20 at step 800 and selects an option to create a user account at step 802. The data entered by the user may be used in determining whether a user allows unsolicited offers to be presented from the exchange server. In addition, offers may be provided in an automatic fashion without user interaction. The user's preferences for manufactured goods services, products, travel destinations, hobbies, interests or any other user entered criteria may be stored in the database for subsequent use by the system (steps 804 and 808). The exchange server has the ability to receive offers from reward servers or merchants (steps 806 and 808) which may then be directed in real time to users based on the database profile information provided by the user or other third party (e.g an issuer, merchant, etc.) (see FIG. 9). At step 900, the reward server contacts the exchange server with an offer to redeem points. Similarly, a merchant may contact the exchange server with an offer to be distributed or offered in the exchange to members (step 902). The exchange server records the offer in a database (step 906), and the exchange server may record a conversion rate or rules in its database for that trade (step 906). The reward server may then contact the user with an offer to redeem at step 908. Optionally, the process may branch to the flow diagram in FIG. 6 discussed above (step 910).

The exchange server may also be contacted in response to a button or hyperlink located on a web page accessible by the user from the airline reward server (FIG. 10, steps 1000 and 1002). The process may continue to that described with respect to FIG. 6 for trading points into a reward exchange account (step 1004). In a similar manner, hyperlinks or calling routines may allow a user to access a reservations system or merchant from the exchange server. The link would direct the user to partner or associated air carriers where the points in a user exchange account on the exchange server 20 may be used to acquire hotel accommodations, special offers, reduced fare or charter or free flights.

The system used to implement the aforementioned method will now be disclosed with respect to FIG. 5. The system is comprised of an exchange server computer connected to a network of computers where a user interface is established whereby a user from a user computer may access the server to request the transaction to contact a reward server computer system. In the preferred embodiment, the server has memory means for storing the user account information, user profiles and rules which may be specified by the user, system, issuer, member or merchant. The exchange server also has communications means to allow users to access the server and to allow the exchange server to contact reward servers and processing means to interpret the rules and coordinate the contact to the respective servers. The processing means is adapted to allow the user to request and exchange consideration for rewards from reward servers. The processing means additionally is adapted to coordinate the exchange of consideration and increase or decrease the user exchange accounts stored in memory in response to actions performed by the user computer, reward server and merchants and issuers.

In one aspect of the invention, new products may be made available in the exchange before they are generally available to the public ("advance sales"), so that the manufacturers can determine the demand for the products prior to committing to the full costs of marketing and distribution of the products.

In another aspect of the invention, reward points are considered to have a par value, which is the cost of redeeming a point by the issuing entity. For example, assume that a points issuer assigns a par value of 0.25 cents per point. When the points issuer awards 10,000 points to a customer (e.g. for flying 10,000 miles), then the actual cost to the issuer is $25.00. This par value is the value that the issuer will assign to the outstanding points on its records for redemption, surrender or retirement. Thus, an issuer with 10,000,000 points awarded has a liability (sometimes referred to as a contingent liability) of $25,000.

Points also may be considered to have a retail value which is the value that a consumer or user obtains (or perceives that he or she should fairly obtain) based on redeeming or surrendering the points, for example in a redemption transaction. For example, most consumers ascribe a retail value of 1 cent per point. This means that an account that has 10,000 points in it has a total retail value of $100.00 to that consumer. In the event that a consumer is only able to redeem those 10,000 points for something worth less than $100, he has obtained less than the full retail or perceived value and this transaction is unattractive to him. Likewise, in the event that the consumer is able to redeem those 10,000 points for something with a perceived value worth more than $100, he has obtained more than the full or perceived retail value and this transaction is attractive to him. Issues arise when the par value (the value that the issuer is willing to convey in order to surrender or retire the points) is less than the retail value (the value that the consumer is willing to accept to redeem the points), which issues are addressed and resolved by an embodiment of the present invention described herein.

In one embodiment, the par value of the points may be varied by the points issuer, after issuance (e.g. while in an account of a user), based upon factors such as the rate of redemption of points by other users. For example, if the rate of redemption becomes excessively large, this may negatively impact the cash position of the issuer since points redemption generally results in cash flow out of the issuer to product and service providers. Thus, when an issuer determines that the cash flow is excessive, it may reduce the par value such that subsequent redemptions will result in a lower cash flow rate. For example, an issuer may be normally redeeming points at the rate of 0.25 cents per point; that is, it pays 0.25 cents to a merchant or aggregator when directed by a user in exchange for reducing the user's points account by one point. In the event that an excessive number of points are redeemed or tendered, then the issuer (or aggregator or trader) may change the value to 0.125 cents per point such that the user would only receive a $12.50 credit for redeeming 10,000 points. The issuer/aggregator may continue this reduced rate of exchange until such time that cash flow levels out to an acceptable rate. Of course, the issuer may also further reduce the exchange rate in order to ameliorate the cash flow even further, if desired. In addition, certain types of trades or redemptions may be limited from time to time in order to control redemption rates, etc.

Likewise, in an embodiment wherein a product liquidator charges a certain liquidation price in exchange for points redemption, then the liquidator may also vary the liquidation price based upon the current or projected sales volume. Thus, when the rate of sales increases due to a relatively low product price offering, then the liquidator may increase the price to either (1) slow down the redemption rate, and/or (2) increase its cash flow.

In a further embodiment, a bulletin board may be used on a computer network wherein the value of points, last trade price, bid/ask parameters, etc. are posted to provide a points exchange environment.

In the preferred embodiment, the memory means comprises a database structure that is used to record the transactions associated with the previously described method. Records indicating the changes and current value of user exchange accounts are updated according to the request processed by the processor. This invention also implements the recording and subsequent reporting of factors such as the average retail value redeemed to date, the rate of redemption, and other liquidation liability factors.

In response to a request for redemption, the exchange server looks up the contact properties of the reward server to be contacted. Properties may be fixed for a certain time or variable on a bid/ask basis per trade. Market offers can be fixed for a certain time, or value, or product. The user information is submitted to the reward server to display the available points that may be redeemed. In another embodiment, the request additionally contains a value to be redeemed. The processor establishes a communication link with the reward server and a transaction request is sent to the processor of the reward server. The processor of the reward server may perform actions that may allow or refuse the requested action, or suggest an alternative action. In another embodiment, the exchange server processor may be granted direct authorization to modify the user's records in the reward server database without analysis by the processor of the reward server. A conversion rate may be applied to the transaction such that the reward server reduces the available rewards or value in the user's account. The reward server then transfers consideration to the exchange server that corresponds to the value reduced or available in the reward system. In response to the receipt of the transfer or approval of the transfer, the exchange server increments the user account balance to reflect the received (or issued or acquired) consideration and the connection to the reward server is terminated. A transaction log may be used to record each of the transactions in case a reconciliation process is required at a later time. The new value, whether increased or decreased in the user's exchange account may then be stored until a user finds an item to be purchased or trade to be engaged.

The user selects the desired object from the merchants (or offering menu in the exchange) by indicating the type of product or service to be procured. In one embodiment, the exchange server contacts the merchant server to return to the user a list of products that match the user's search criteria or if the user had specified in detail what was desired, the product may be directly acquired from a merchant, trader, member or broker/dealer. A communication link is established between the exchange server and the merchant computer or designee for e-commerce. Direct acquisition may be enacted by contacting the merchant or broker/dealer computer and supplying the user indicia, the product indicia, and the retail value sufficient to secure the transaction. In response to the transaction request, the merchant computer or broker/dealer will receive the consideration supplied and contract for the delivery of the product. Unfulfilled requests are stored and when available can be pushed to the user. In another embodiment, the consideration required for the item selected is sent to the exchange server where based on the available points in the user's exchange account the exchange server will determine whether the consideration is available. An authorization process may be incorporated at this point to request authorization from the user or in a more simplified process, the consideration will be transferred to the merchant computer and the user's exchange account will be reduced. The merchant computer will receive the consideration and will effectuate a delivery transaction to be issued.

The goods may also be placed under direct control of a distribution arm of the trading service so that the user places the order with the trading service directly and the merchants are not directly involved with the sale of the goods.

In a situation wherein the user finds it necessary or desirable to return a product, such as when the product may be damaged, then provision is made for the restocking of points back into the user account (rather than a cash refund), with an optional restocking fee being charged to the user in the form of points.

Thus, the present invention provides a liability management system for issuers of reward points, which allows them to retire points (take points off the books) and eliminate them, if desired, at a discounted (or premium) rate. This system enables the sale or repurchase of points with a trading strategy in which points need not expire, or may be retired at a controlled rate or value. The value ascribed to the points (the par value) may be changed by the points issuer/aggregator based on the rate of redemption of the points with respect to the issuers' ability to maintain cash flow, or as may be determined by the market. That is, the par value of the points may be varied by the points issuer, after issuance, based upon factors such as the rate of redemption of points by other users. For example, if the rate of redemption becomes excessively large, this may negatively impact the cash position of the issuer since points redemption generally results in cash flow out of the issuer to product and service providers. Thus, when an issuer determines that the cash flow is excessive, it may reduce the par value such that subsequent redemptions will result in a lower cash flow rate. Likewise, when an issuer determines that the cash flow is low, it may if so desired increase the par value such that subsequent redemptions will result in a higher cash flow rate The present system may be implemented by means of a smart card (or credit/stored value card, or loyalty or frequency of use card) wherein frequent use points may be accumulated on the user's card every time the card is used for associated application. For example, if a user uses his smart card to pay for a hotel that normally gives reward points, those reward points may be stored on the smart card. Likewise, when the card is used for the purchase of an airline ticket, the points would be added to the smart card. The user may then redeem the accumulated reward points by inserting the card into a reader associated with a computer connected to the Internet or other authorized communication system (e.g. an ATM/POS device or other reader). The trading process proceeds as described above, except that the points are obtained directly from the smart card or system rather than a reward server. Information provided to the user regarding the user's reward points is updated after every transaction.

The user may have a credit card, debit card, or stored value card that is linked to their points account in such a way as to permit them to pay for purchases with a merchant by using the card, wherein the merchant uses the existing credit card payment infrastructure as if payment were being made/authorized by a bank linked to the credit card or debit card account, but in fact the card may be linked to the user's points account. In this manner, the user and merchant can use the points account to pay for purchases in a seamless manner whereby points are used for consideration rather than or as a supplement to cash and traditional credit.

Other aspects of this invention will now be disclosed that will enhance the reader's understanding of the application of this invention.

The user can purchase points from the system, borrow points from the system, option points from the system, etc., and basically treat the points as cash consideration or as a commodity for purposes of such transactions. Points may be borrowed by a consumer or other member of the network in order to use them to obtain liquidated or other products, the consumer will be required to pay interest to the points issuer/aggregator or provider based on the points borrowed. Since the value of the points borrowed may be measured by the price of the liquidated products purchased with those points, and the liquidation price may be varied by the liquidation broker, then the relative interest rate charged by the issuer may vary as well. For example, a consumer wants to purchase a TV with an MSRP of $1,000 from a liquidation broker. The consumer contracts with a bank (or other lender) to borrow 100,000 points from a bank, which in this case acts as the points issuing entity. The bank agrees to convey consideration to the liquidation broker to cover the cost of the TV, and the consumer agrees to repay the value of 100,000 points to the bank with interest at a rate of 10%. The bank, however, is only required to pay a liquidation sum of $500 to the liquidation broker in exchange for the TV being delivered to the consumer. Thus, the bank has provided 100,000 points to the consumer to obtain the TV, but has only had to expend $500 in cash, thus doubling the effective rate of return on the lending of points to the consumer. The consumer may also borrow points for purchase of non-liquidated items as well.

The system can prioritize the order of points being traded based on a predetermined set of rules such as in higher value points being issued before those with a lower value.

Merchandisers also benefit from the use of this system where another marketing channel is afforded for products that are often purchased by frequent travelers with high disposable income. Products and services encompassing jewelry, flowers, limousine transport, timeshare rental may be exchangeable for points stored in this system. Items purchased through the system may also be paid for by a combination of points and currency which might be the case when a user does not have enough accrued points to meet the purchase consideration of an item selected. There may be designations where a percentage of the product may be paid with points, with the rest in cash or cash equivalent.

It is anticipated that high quality limited access products may benefit from the distribution methods afforded by this system. For example, companies like SONY and Chanel may take advantage of this distribution means without impacting the level of quality or excellence associated with their products.

Manufacturers can discount or liquidate goods for points in a manner that doesn't negatively affect the perceived value of the goods (i.e. not in direct competition with the mainstream sales). That is, the manufacturer can place overstocked, end of run type goods and the like, place them in the chain of distribution for exchange with points, and not be in direct competition with cash sales of its mainstream products.

Resort destinations that are managed by property management companies such as RCI may be integrated into this system where instead of trading accommodations with only those having similar property, it is now possible that the rental of the property may be achieved by conversion for points or points plus a property timeshare or a percentage of cash. Rooms or inventory or any vacation product (e.g. boat timeshares) may be booked with discounts that vary in accordance with the number of rooms available, which can change in real time as per the changing availability of rooms or inventory.

Offers may be distributed to users of this system where substantial rebates or reduced rates are described in the offer. Time sensitive product offerings can also be accommodated in the system where the value of the product is decreased according to a life span of the product. Time sensitive product offerings such as food products or concert tickets, airline departures, hotel room rentals and the like can have an associated diminishing or escalating value based on the length or availability of the offer. This invention may be used to provide hotel rooms such that when rooms are available and the date of use approaches, the rental price may decrease or increase (the same methodologies may be used to sell advertising space that is time-sensitive).

Using this system it is now possible to coordinate the products of several different providers into one package. A user of this system may therefore select an airline, hotel, car rental and Broadway show tickets in New York, individually or in a prepared package from one location by trading points where the package may not have existed before where the trading system coordinates all aspect of the transaction and reduces the user's exchange rewards in a corresponding manner.

A purchasing club, organization, corporation or group may utilize the present invention in order to purchase items in bulk. For example, a transaction may be configured wherein a purchasing club can obtain 100 TVs at a substantial discount, if and only if they agree to purchase all or a substantial portion of them.

Other purchasing leverage not specifically addressed previously may also be acquired by combining the power of a pool of users of this system where these users may be allocated access to products or services not generally distributed to the remainder of the system users. Points collected in the system by these users may afford them access to limited distribution channels where higher discount levels or premium products may be acquired. Direct access to cartel or special club products such as diamonds, bulk or price-advantaged products, duty free items and other restricted access product or service offerings are also accommodated through the coordination of the exchange server with these specialized service and product providers. For example, a preferred client distribution channel such as found in a European market for luxury goods would be made available to users of this system where the prices for the objects in this preferred channel may be significantly lower than retail for objects that are typically reserved for limited distribution at premium prices. The exchange server may additionally have exclusive rights to allocate access to certain premium products, services, events, travel destinations or accommodations in accordance with any right or grant permitting such allocation to any user of the system. A distribution channel may make available exclusive products for all or a limited amount of the members of the system where the exchange server system controls access to the offer. Parameters associated with the available quantity, duration, exchange rates, etc may be input into the system to be used in the allocation algorithm to restrict the offer. Upon user access, the exchange server would, in these cases, modify the premiums offered to reflect the immediately attainable items for the current user and may additionally display or provide access to premiums that may be acquired through payment by other means (i.e. cash, charge, debit) to make up the difference between the user's available points and the points required to accept the offer.

Junkets and cruises may be obtained in exchange for points and/or other consideration using the methods of the present invention as described herein. Video and/or music files may be downloaded or otherwise obtained in exchange for points and/or other consideration using the methods of the present invention as described herein.

In one embodiment, the present invention utilizes a graphic on a web page that shows the availability of an item, such as the number of items left (or about to expire) for a given offer-similar to a running meter. This meter would be updated in real time so that a user would know when the offer will soon be expired due to unavailability of an item.

In another embodiment of this invention, airlines seeking to provide higher levels of personalized service for their business travelers will provide access to the Internet or access to in-flight services such as video games, for a fee or in place of granting mileage rewards on transcontinental or transatlantic flights. Access to video games or other services (e.g. meals and drinks) may be afforded to the traveler where the availability of different games depends on the number of reward points traded in by the traveler. The rewards may be converted using the exchange server of this invention, where the user may opt to forego collecting mileage in return for accessing on-board entertainment provided in a standalone mode or in a linked mode. For example, users may select to play video games, access the Internet or utilize Email via a seatback or tray table mounted interface and controller. The user may optionally connect a laptop computer to an interface port of the aircraft using an Ethernet, parallel, USB connection or proprietary connector provided by the air carrier. In the preferred embodiment, the user would select the connection speed and type for communications based on whether in-flight or external services were to be accessed. Other types of business services may additionally be used and accounted for, such as using network printers or fax equipment. RF, satellite or microwave based communications may be used for real time communications where sufficient geographical coverage is provided.

The interface would allow a user to login using the frequent flyer account information or preferably, the exchange server account login id and password, where the user may use points awarded from another air carrier or point server to "pay" for the services accessed. The account balance from the exchange server may be transferred to the local controller prior to takeoff for each user that logs in to the exchange server. Once the plane has departed, depending on the linking or access capability afforded by the air carrier or service provider, the user's account may be modified in real time or upon reconnection following landing, based on services selected by the traveler. If a real time link is supported, the user's exchange account may be periodically debited according to the services selected and duration of use, certified against the passenger log.

In another aspect of the invention, an electronic liquidation or bartering system is implemented, wherein product providers such as manufacturers, wholesalers, retailers, producers, distributors, etc. can provide surplus, returns, discontinued or overstocked goods for liquidation into the chain of supply of the system and exchange then for points as described herein. This provides an inventory management and liquidation system for these manufacturers and sellers. This embodiment is further described with respect to FIG. 11.

In this embodiment, three basic functions are performed—typically by three distinct parties, but one party could perform more than one function in some embodiments. The three functions are (1) a product provider 1100, which provides a product (or service), (2) a transacting entity 1102, which provides transaction facilitation or supervision, and (3) a reward account holder 1104, which provides issuance and/or aggregation of reward points that will be used towards the purchase of the product or service in a transaction carried out by the transacting entity 1102 The reward account holder may be a reward point issuer 1106 or it may be a reward exchange trading entity 1108 that aggregates reward points from multiple reward point issuing entities 1110 as previously described. In either case, the reward account holder maintains an account on behalf of a user that holds value, typically in the form of reward points that have a par value (the value the reward account holder is willing to pay on surrender of the points) as well as a retail value (the value a user desires to obtain from redeeming or surrendering the points) as previously described. In some cases, reward points may be exchanged or aggregated in real time (at the time of redemption for a product as described herein.

In some cases, a product provider 1100 might perform functions of the transacting entity 1102 as well, or the reward account holder 1104 (i.e. the reward points issuer and/or aggregator) might perform the functions of the transacting entity 1102 (in these cases, there are only two entities performing the three functions). In another case, the reward account holder 1104 may provide the products as well, or the transacting entity 1102 may provide the product, etc. In certain cases, one party may perform all three functions.

Figure 11:
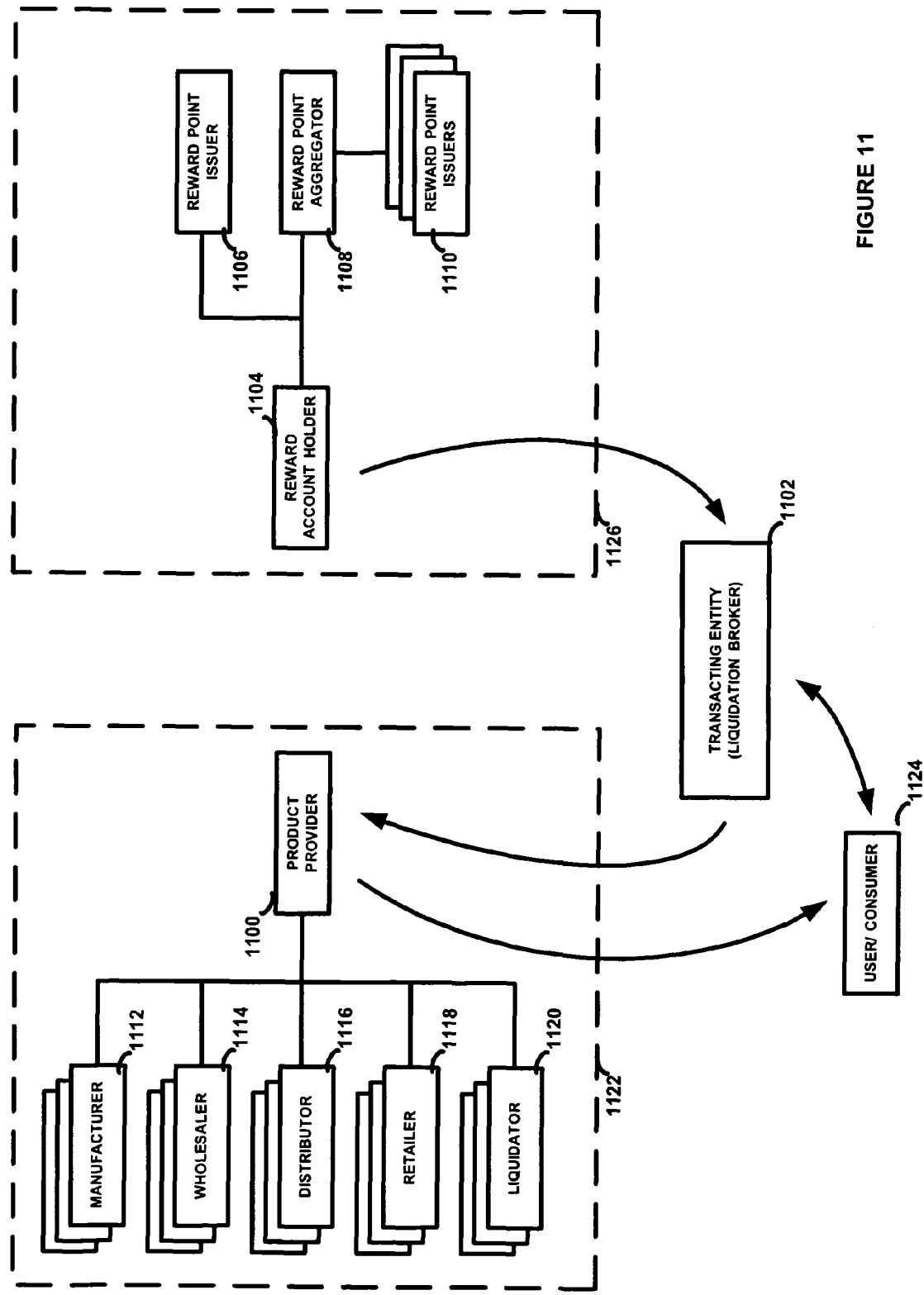
FIG. 11 is a block diagram of the liquidation process of the present invention.

In a typical embodiment, FIG. 11 shows a system for executing a product liquidation transaction in association with a product liquidation service run by a transacting entity 1102. The transacting entity (referred to herein also as the liquidation broker) may be an independent third party, the exchange system itself, or the functions performed by the liquidation broker 1102 may be performed by a product or service provider 1100 or reward points issuer 1106 or aggregator 1108. In the case where the liquidation broker 1102 is an independent third party (FIG. 11), one or more product providers 1100 (such as a manufacturer 1112, wholesaler 1114, distributor 1116, retailer 1118 or liquidator 1120) subscribe to the liquidation service provided by the transacting entity 1102, thus forming a product supplier network 1122 in association with the transacting entity 1102. Products to be liquidated may be made available to the user or consumer 1124 directly from the manufacturer 1112, or via any other product provider 1100. For example, a television manufactured by SONY may be liquidated under this invention directly from SONY (such as from the SONY web site www.sony.com), or from a distributor 1116 or other product provider 1100, etc. In addition, the product to be liquidated may be made available from a web site catalog of a points issuer/aggregator or some other third party or listed directly on a points exchange server through a pre-arranged agreement with the provider of the product or directly listed or advertised by the exchange server or network. The actual source of the product to be liquidated under this invention makes no difference to the consumer 1124, who will obtain the product substantially in exchange for reward points as now described.

One or more reward account holders also subscribe to the liquidation service provided by the liquidation broker or transacting entity 1102, thus forming a reward points network 1126 in association with the liquidation broker. As shown in FIG. 11, the liquidation broker 1102 acts as an intermediary between the product provider network 1122 and the reward points network 1126 to provide a product selected by a consumer 1124 from the product provider network 1122 substantially in exchange for reward points in a user's reward points account held by a reward account holder that is part of the reward points network 1126.

In accordance with this invention, a consumer 1124 obtains a liquidated product in exchange for reward points from his or her reward point account, wherein the transaction is brokered and supervised by the liquidation broker as the transacting entity. The consumer will provide consideration in the form of a combination of reward points and a cash (or credit based) portion, wherein the total value of the cash portion and the retail value of the points as previously defined is substantially equivalent to a reference price such as the MSRP (manufacturer's suggested retail price). In this manner, it does not appear to the consumer that it is a liquidation purchase (i.e. the liquidation aspects of the transaction are transparent to the consumer or purchaser or acquirer), and the usual brand devaluation that would normally occur with liquidation sales does not occur. For example, assume that the retail value is considered by a consumer in a given transaction to be 0.01 (one cent) per point, and the consumer wants to purchase a SONY television at an MSRP of $1,000. The consumer views a web page from a web site maintained by one of the parties, such as the liquidation broker, and is given an offer to acquire the SONY television in exchange for $250 cash and 25,000 reward points. Since the retail value of each reward point in this case is 0.01, the consumer perceives that he has paid a value equivalent in reward points to $250 (25,000×0.01=$250) plus the $250 cash, for a total perceived value of $500, which is still much less than the MSRP of $1,000.00 for the television. As a result, the consumer perceives that he has received value of $750 for his 25,000 reward points, which is 0.03 per point or three times the retail value, and his or her incentive to use this system is the ease of purchasing the product using only reward points at a much higher retail value (or reward points and other consideration such as cash or credit card in an alternative embodiment). The consumer perceives that he has paid cash and reward points equal to the MSRP of the television with his reward points having a retail value of three cents each, which is highly attractive to the consumer.

In this situation, the liquidation broker receives the $250 cash payment from the consumer and pays $250 to the product provider (SONY or a distributor) in full payment for the television, which is delivered to the consumer. The liquidation broker also causes the consumer's reward points account, held by a designated reward account holder, to decrease by the 25,000 points. The liquidation broker can then take one of several actions. First, it may simply transact with the reward account holder to redeem those 25,000 points, at a par value of 0.25 cents per point paid by the reward account holder to the liquidation broker, which provides a cash flow of $62.50 which is fully retained by the liquidation broker. This provides a 25% profit margin to the liquidation broker based on the initial $250 transaction. In the alternative to redeeming or surrendering the points directly with the reward account holder, the liquidation broker may seek to sell the points to a $3^{rd}$ party marketer at a resale value of 0.01 per point (One cent per point). This would provide a profit of $250 rather than $62.50. The $3^{rd}$ party marketer has incentive to purchase points at 0.01 per point since it usually must do so at 0.02 per point directly with the issuer.

In the alternative, if the product is provided directly from the manufacturer to the consumer or exchange system, then the liquidation broker or exchange system pays the manufacturer directly and retains the balance as its profit.

In an alternative embodiment, the liquidation brokerage functions are performed by the product provider 1100 rather than an independent third party 1102. In this case, then the product provider 1100 interacts with the consumer 1124 to receive a request for a product being liquidated (e.g. a selection on a web page), interacts with the reward account holder 1104 to remove the reward points from the consumer's account, receives consideration in exchange for removing the reward points from the reward account holder, arranges for conveyance or delivery of the liquidated item to the consumer, and retains a substantial profit (the difference between full consideration received from the reward account holder and the liquidation price paid to the product provider).

In another alternative embodiment, the reward account holder may act as the liquidation broker. In this case, a consumer, would select the desired product from a catalog or web site provided by the reward account holder, and the reward account holder would convey consideration (the liquidation price) directly to the product provider. So, for example, when the liquidation price is $250.00 and the MSRP is $1,000.00, the manufacturer receives $250.00 and the consumer's reward points account is debited by 100,000 points. Here, the reward account holder reaps the benefit of the higher profit margin for the liquidation transaction.

Accordingly, several benefits are realized by this aspect of the invention. The reward account holder (whether it is a reward point issuer or an aggregator) realizes a decrease in a liability associated with the reward account that is substantially more than the total consideration paid for the transaction. The consumer receives the desired product substantially in exchange for reward points, and said manufacturer liquidates the product at substantially the same price that it would otherwise realize in a standard wholesale transaction.

As described herein, the product to be liquidated and obtained by the user may be provided by any of the product providers in the product distribution chain (i.e. the manufacturer 1112, wholesaler 1114, distributor 1116, retailer 1118 or liquidator 1120). In addition, the product may exist at several or all of these product providers, and it may be delivered (e.g. drop shipped) to the user after payment is tendered to any party having a contractual arrangement to do so. For example, a manufacturer may transact with the liquidation broker and obtain payment as described above, but instead of delivering the product directly from the manufacturer to the user, the product may be located at a distributor and the manufacturer may request the distributor to ship the product to the user. In this event, the manufacturer may provide a credit to the account of the product provider that ships the product to the user, for example in the form of new products that would replace the liquidated product. An example of this would be if a manufacturer decides to liquidate a certain older television model, and instructs all product providers in the distribution line that they will receive a newer television model for the older models that they ship under this liquidation process. In this manner, a product that exists at some or all of the entities in the distribution chain (distributor, retailers, etc.) may be liquidated without the manufacturer (or any single entity transacting with the liquidation broker) being required to have actual physical possession of the product for shipment to the user. This enables the manufacturer to liquidate a product from the marketplace quickly (e.g. without having top recall them) and reduce the time to market for new products.

In another embodiment, the liquidation broker sets up a points escrow account on behalf of the consumer, and acts to transfer reward points from one or more issuers into the escrow account when requested by the consumer. The liquidation broker may then carry out liquidation purchase transactions as further requested by the consumer.

In another embodiment, the value of the reward points may fluctuate as a function of the company's performance, which may be measured by reference to the price of its stock, revenue, earnings, or some other parameter that is agreed to that reflects the relative performance of the company The number or value of points outstanding being redeemed also may also be a factor). In this manner, companies that perform well would provide an additional incentive to a user for using their frequent use program rather than a competitor's program. For example, all other parameters being the same, a user would likely choose the Acme credit card company over the Beta credit card company when the user determines that the Acme company performance results in a 10% increase in the value of points otherwise earned by using its credit card. The value may also fluctuate as a function of the number of points outstanding or the desirability of the issuer to reduce its liability or make it more robust.

In a further embodiment, the present invention may be utilized to allow users to pay for items won in an auction with points aggregated as described above. In this embodiment, a user may participate in an auction, such as one of many known auction services executed over the Internet, whereby a user selects an item that he or she would like to bid on from a web page provided by a merchant computer web site, or even by a web site hosted by the exchange server computer or a third party auction service provider. The auction may be carried out in any number of well known ways, such as for example when all bidders may bid up until a date and time when the auction ends, and the highest bidder or group of bidders wins the auction. The winning bidder may then designate reward points from his or her reward points exchange account to be used to pay for the item bid for and won in the auction. The accumulated reward points are selected by the user, and consideration is conveyed to the merchant/seller in exchange for the auctioned item as described above.

I claim:

1. A computer-implemented method of executing a product liquidation transaction in conjunction with a reward account stored on a reward server computer, comprising the steps of:
   a. a user having a reward account stored on a reward server computer associated with a reward account issuer comprising reward points previously awarded by a reward issuing entity to the user as part of a previous transaction, the reward points having (i) a par value established by the reward account issuer equivalent to the amount that the reward account issuer will convey upon surrender of said reward points, and (ii) a retail value equivalent to an amount that the user will accept for surrender of said reward points, said retail value being substantially higher than said par value;
   b. a product provider offering to sell a product at a liquidation price that is substantially less than a reference price otherwise charged for the product;
   c. the user requesting a transacting entity to facilitate the user in obtaining the product by surrendering at least some of the reward points from the reward account stored on the reward server computer to the reward account issuer, the number of reward points surrendered having a par value substantially equal to the liquidation price and a retail value substantially equal to the reference price;
   d. requesting the reward account issuer to convey to the transacting entity the par value of the surrendered reward points;
   e. the transacting entity conveying consideration to the product provider equivalent to the liquidation price of the product; and
   f. the product provider causing the product to be conveyed to the user;
   whereby the user receives the product from the product provider as a result of surrendering the reward points; from the reward account stored on the reward server computer.

2. The method of claim 1 wherein the product provider is a merchant.

3. The method of claim 1 wherein the product provider is a manufacturer.

4. The method of claim 1 wherein the product provider is a wholesaler.

5. The method of claim 1 wherein the product provider is a distributor.

6. The method of claim 1 wherein the product provider is a liquidator.

7. The method of claim 1 wherein the product provider is retailer.

8. The method of claim 1 wherein the product provider is broker/trader.

9. The method of claim 1 wherein the product provider is an entity operating on a points exchange network.

10. The method of claim 1 wherein the steps performed by the transacting entity are performed by a liquidating service.

11. The method of claim 1 wherein the steps performed by the transacting entity are performed by the reward account issuer.

12. The method of claim 1 wherein the steps performed by the transacting entity are performed by the product provider.

13. The method of claim 1 further comprising the step of the transacting entity advertising the availability of the product in exchange for reward points.

14. The method of claim 13 wherein the liquidation price of the product is equivalent to the par value of the reward points and other consideration.

15. The method of claim 13 wherein a transaction fee is conveyed from the user to the transacting entity in exchange for executing the transaction.

16. The method of claim 13 wherein a transaction fee is conveyed from the reward account issuer to the transacting entity in exchange for executing the transaction.

17. The method of claim 13 wherein a transaction fee is conveyed from the product provider to the transacting entity in exchange for executing the transaction.

18. The method of claim 1 wherein the reward account issuer is a single reward issuing entity.

19. The method of claim 1 wherein the reward account issuer is an aggregator and the reward account is an exchange account comprising reward point value obtained as a result of exchanging reward points from separate reward point accounts stored in separate reward point server computers in association with different reward issuing entities.

20. The method of claim 1 wherein the reward points are represented by frequent flyer miles awarded by an airline.

21. The method of claim 1 wherein the reward points are represented by cash-back value.

22. The method of claim 1 wherein the reward points are represented by gift certificates.

23. The method of claim 1 wherein the reward points are represented by product rebate value.

24. The method of claim 1 wherein the product provider conveys the product to the user directly.

25. The method of claim 1 wherein the product provider causes a second party to convey the product to the user.

26. The method of claim 25 wherein the product provider gives a credit to the second party in exchange for the second party conveying the product to the user.

27. The method of claim 26 wherein the product provider provides an alternative product to the second party in exchange for the second party conveying the product to the user.

28. A system for executing a product liquidation transaction comprising:
 a. a reward points server computer selectively interconnected over a computer network and associated with a reward account holder issuer, comprising data storage means for storing a reward account associated with a user, the reward account configured to track reward points previously earned by the user for previous transactions between the user and a reward issuing entity, wherein the reward points have (i) a par value established by the reward account issuer equivalent to the amount that the reward account issuer will convey upon surrender of said reward points, and (ii) a retail value equivalent to an amount that the user will accept for surrender of said reward points, said retail value being substantially higher than said par value;
 b. a product provider server computer selectively interconnected over the computer network and associated with a product provider, comprising means for offering to sell a product at a liquidation price that is substantially less than a reference price otherwise charged for the product;
 c. a user computer selectively interconnected over the computer network and associated with a user, comprising means for requesting a transacting entity to facilitate the user in obtaining the product by surrendering at least some of the reward points to the reward account issuer, the number of reward points surrendered having a par value substantially equal to the liquidation price and a retail value substantially equal to the reference price;
 d. a transaction server computer selectively interconnected over the computer network and associated with a transacting entity, comprising:
  i. means for requesting the reward account issuer to convey to the transacting entity the par value of the surrendered reward points;
  ii. means for conveying consideration to the product provider equivalent to the liquidation price of the product;
 whereby the user receives the product from the product provider as a result of surrendering the reward points.

29. The system of claim 28 wherein the product provider is a merchant.

30. The system of claim 28 wherein the product provider is a manufacturer.

31. The system of claim 28 wherein the product provider is a wholesaler.

32. The system of claim 28 wherein the product provider is a distributor.

33. The system of claim 28 wherein the product provider is a liquidator.

34. The system of claim 28 wherein the product provider is retailer.

35. The system of claim 28 wherein the transacting entity is a liquidating service.

36. The system of claim 28 wherein the transacting entity and the reward account issuer are the same entity.

37. The system of claim 28 wherein the transacting entity and the product provider are the same entity.

38. The system of claim 28 wherein the transaction server computer further comprises means for advertising the availability of the product in exchange for reward points.

39. The system of claim 38 wherein the liquidation price of the product is equivalent to the par value of the reward points and other consideration.

40. The system of claim 38 wherein a transaction fee is conveyed from the user to the transacting entity in exchange for executing the transaction.

41. The system of claim 38 wherein a transaction fee is conveyed from the reward account issuer to the transacting entity in exchange for executing the transaction.

42. The system of claim 38 wherein a transaction fee is conveyed from the product provider to the transacting entity in exchange for executing the transaction.

43. The system of claim 28 wherein the reward account issuer is a single reward issuing entity.

44. The system of claim 28 wherein the reward account issuer is an aggregator and the reward account is an exchange account comprising reward point value obtained as a result of exchanging reward points from separate reward point accounts stored in separate reward point server computers in association with different reward issuing entities.

45. The system of claim 28 wherein the reward points represented by frequent flyer miles awarded by an airline.

46. The system of claim 28 wherein the reward points are represented by cash-back value.

47. The system of claim 28 wherein the reward points are represented by gift certificates.

48. The system of claim 28 wherein the reward points are represented by product rebate value.

49. The system of claim 28 wherein the product provider conveys the product to the user directly.

50. The system of claim 28 wherein the product provider causes a second party to convey the product to the user.

51. The system of claim 50 wherein the product provider gives a credit to the second party in exchange for the second party conveying the product to the user.

52. The system of claim 51 wherein the product provider provides an alternative product to the second party in exchange for the second party conveying the product to the user.

53. A method of a transacting entity facilitating a product liquidation transaction comprising the steps of:
   a. a transacting entity offering a product for sale from a product provider to a user in exchange for a quantity of reward values, the reward values being stored in a reward account held by a reward account holder on a reward server computer comprising reward values previously provided by a reward issuing entity to the user, the reward values having a par value attributed by the reward account holder equivalent to a first amount that the reward account holder is willing to convey upon surrender of said reward values, the reward values also having a retail value attributed by the user equivalent to a second amount that the user is willing to accept upon surrender of said reward values, wherein the retail value of the quantity of reward values is equivalent to a reference price;
   b. accepting a request from a user to convey the product in exchange for the quantity of reward values from the reward server computer specified by the transacting entity;
   c. causing the reward account on the reward server computer to be reduced by the quantity of reward values specified by the transacting entity;
   d. effecting a transfer of consideration from the reward account holder on the reward server computer to the product provider, the consideration equivalent to a liquidation price that is substantially less than the reference price, the liquidation price equivalent to the par value of the reward values surrendered; and
   e. causing the product provider to transfer the product to the user.

54. The method of claim 53 wherein the product provider is a merchant.

55. The method of claim 53 wherein the product provider is a manufacturer.

56. The method of claim 53 wherein the product provider is a wholesaler.

57. The method of claim 53 wherein the product provider is a distributor.

58. The method of claim 53 wherein the product provider is a liquidator.

59. The method of claim 53 wherein the product provider is retailer.

60. The method of claim 53 wherein the product provider is broker/trader.

61. The method of claim 53 wherein the product provider is a points exchange network.

62. The method of claim 53 wherein the steps performed by the transacting entity are performed by a liquidating service.

63. The method of claim 53 wherein the steps performed by the transacting entity are performed by the reward account holder.

64. The method of claim 53 wherein the steps performed by the transacting entity are performed by the product provider.

65. The method of claim 53 further comprising the step of the transacting entity advertising the availability of the product in exchange for reward values.

66. The method of claim 65 wherein the liquidation price of the product is equivalent to the par value of the reward values needed to obtain the product.

67. The method of claim 66 wherein a transaction fee is conveyed from the user to the transacting entity in exchange for executing the transaction.

68. The method of claim 66 wherein a transaction fee is conveyed from the reward account holder to the transacting entity in exchange for executing the transaction.

69. The method of claim 66 wherein a transaction fee is conveyed from the product provider to the transacting entity in exchange for executing the transaction.

70. The method of claim 65 wherein the liquidation price of the product is equivalent to the par value of the reward values and other consideration.

71. The method of claim 53 wherein the reward account holder is a single reward issuing entity.

72. The method of claim 53 wherein the reward account holder is an aggregator and the reward account is an exchange account comprising reward point value obtained as a result of exchanging reward values from at least one or more different reward issuing entities.

73. A product transaction server computer comprising:
   a. means for offering a product for sale from a product provider to a user in exchange for a quantity of reward values, the reward values being stored in a reward account held by a reward account holder comprising reward values previously provided by a reward issuing entity to the user, the reward values having a par value attributed by the reward account holder equivalent to a first amount that the reward account holder is willing to convey upon surrender of said reward values, the reward values also having a retail value attributed by the user equivalent to a second amount that the user is willing to accept upon surrender of said reward values, wherein the retail value of the quantity of reward values is equivalent to a reference price;
   b. means for accepting a request from a user to convey the product in exchange for the quantity of reward values specified by the transacting entity;
   c. means for causing the reward account to be reduced by the quantity of reward values specified by the transacting entity;
   d. means for effecting a transfer of consideration from the reward account holder to the product provider, the consideration equivalent to a liquidation price that is substantially less than the reference price, the liquidation price equivalent to the par value of the reward values surrendered; and
   e. means for causing the product provider to transfer the product to the user.

74. A product transaction server computer comprising processing circuitry programmed to operate the computer to:
   a. enable offering a product for sale from a product provider to a user in exchange for a quantity of reward values, the reward values being stored in a reward account held by a reward account holder comprising reward values previously provided by a reward issuing entity to the user, the reward values having a par value attributed by the reward account holder equivalent to a first amount that the reward account holder is willing to convey upon surrender of said reward values, the reward values also having a retail value attributed by the user equivalent to a second amount that the user is willing to accept upon surrender of said reward values, wherein the retail value of the quantity of reward values is equivalent to a reference price;

b. accept a request from a user to convey the product in exchange for the quantity of reward values specified by the transacting entity;

c. cause the reward account to be reduced by the quantity of reward values specified by the transacting entity;

d. effect a transfer of consideration from the reward account holder to the product provider, the consideration equivalent to a liquidation price that is substantially less than the reference price, the liquidation price equivalent to the par value of the reward values surrendered; and e. cause the product provider to transfer the product to the user.

75. A method of a product provider facilitating a product liquidation transaction comprising the steps of:

a. causing a transacting entity to offer a product for sale to a user in exchange for a quantity of reward values, the reward values being stored in a reward account held by a reward account holder on a reward server computer comprising reward values previously provided by a reward issuing entity to the user, the reward values having a par value attributed by the reward account holder equivalent to a first amount that the reward account holder is willing to convey upon surrender of said reward values, the reward values also having a retail value attributed by the user equivalent to a second amount that the user is willing to accept upon surrender of said reward values, wherein the retail value of the quantity of reward values is equivalent to a reference price;

b. authorizing the transacting entity to
  (i) accept a request from a user to convey the product in exchange for the quantity of reward values specified by the transacting entity;
  (ii) cause the reward account on the reward server computer to be reduced by the quantity of reward values specified by the transacting entity; and
  (iii) effect a transfer of consideration from the reward account holder on the reward server computer to the product provider, the consideration equivalent to a liquidation price that is substantially less than the reference price, the liquidation price equivalent to the par value of the reward values surrendered; and c. providing the product to the user.

* * * * *